(12) United States Patent
Yamamaru et al.

(10) Patent No.: US 9,381,820 B2
(45) Date of Patent: Jul. 5, 2016

(54) CHARGING PORT STRUCTURE

(71) Applicant: Nissan Motor Co., Ltd., Yokohama-shi, Kanagawa (JP)

(72) Inventors: Junichi Yamamaru, Ebina (JP); Kazuo Sakata, Ebina (JP); Kiyohito Sekido, Yokohama (JP); Shinichi Matano, Atsugi (JP); Masahiro Onishi, Kamakura (JP); Kyouhei Kawasaki, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/411,925

(22) PCT Filed: Aug. 14, 2013

(86) PCT No.: PCT/JP2013/071939
§ 371 (c)(1),
(2) Date: Dec. 30, 2014

(87) PCT Pub. No.: WO2014/045769
PCT Pub. Date: Mar. 27, 2014

(65) Prior Publication Data
US 2015/0191093 A1    Jul. 9, 2015

(30) Foreign Application Priority Data

Sep. 19, 2012 (JP) ................................. 2012-205529

(51) Int. Cl.
*B60L 11/18*    (2006.01)
*B60L 11/12*    (2006.01)
(Continued)

(52) U.S. Cl.
CPC ........... *B60L 11/1818* (2013.01); *B60L 3/0092* (2013.01); *B60L 11/123* (2013.01);
(Continued)

(58) Field of Classification Search
CPC .............. B60L 11/1818; B60L 11/123; B60L 11/1877; B60L 11/14

USPC ............................... 296/97.22, 193.11, 146.4
See application file for complete search history.

(56) References Cited

U.S. PATENT DOCUMENTS 5,076,622 A    12/1991 Detweiler
5,222,774 A    6/1993 Fukumoto et al.
(Continued)

FOREIGN PATENT DOCUMENTS

DE    4210084 A1    10/1992
DE    10142134 A1    3/2003
(Continued)

OTHER PUBLICATIONS

Anonymous, "Renault Zoe," Wikipedia, last modified on Sep. 27, 2015.

*Primary Examiner* — Jason S Morrow
*Assistant Examiner* — E Turner Hicks
(74) *Attorney, Agent, or Firm* — Global IP Counselors, LLP

(57) ABSTRACT

A charging port structure is provided to prevent unauthorized access. The charging port structure includes a charging port, a port lid, a port lid lock mechanism, a body opening lid, a body opening lid lock mechanism, an electric unlocking mechanism and a manual unlocking structure. The port lid opens and closes a front opening of a port housing having the charging port. The port lid lock mechanism maintains the port lid in a closed state. The body opening lid opens and closes a vehicle body opening. The body opening lid lock mechanism maintains the body opening lid in a closed state. The body opening lid lock mechanism is unlocked from inside a passenger compartment. The electric unlocking mechanism unlocks the port lid lock mechanism. The manual unlocking structure enables the port lid lock mechanism to be unlocked by a manual operation from the vehicle body opening.

14 Claims, 13 Drawing Sheets

(51) Int. Cl.
*B60L 11/14* (2006.01)
*B60L 3/00* (2006.01)
*B60K 1/04* (2006.01)
*B60K 15/05* (2006.01)

(52) U.S. Cl.
CPC ............ *B60L 11/14* (2013.01); *B60L 11/1877* (2013.01); *B60K 1/04* (2013.01); *B60K 2015/0576* (2013.01); *B60L 2250/12* (2013.01); *B60L 2270/32* (2013.01); *B60L 2270/34* (2013.01); *Y02T 10/6217* (2013.01); *Y02T 10/7005* (2013.01); *Y02T 10/705* (2013.01); *Y02T 10/7072* (2013.01); *Y02T 10/7077* (2013.01); *Y02T 90/14* (2013.01)

(56) References Cited

U.S. PATENT DOCUMENTS

| | | | |
|---|---|---|---|
| 7,794,280 | B1 | 9/2010 | Markyvech |
| 8,740,283 | B2 | 6/2014 | Yamamaru et al. |
| 8,933,332 | B2 | 1/2015 | Yamamaru et al. |
| 2011/0115239 | A1 | 5/2011 | Imatomi et al. |
| 2011/0241360 | A1 | 10/2011 | Kitamura |
| 2011/0285166 | A1* | 11/2011 | Baba ................... E05D 11/1007 296/97.22 |
| 2012/0019206 | A1* | 1/2012 | Sekido ................ B60L 11/1803 320/109 |
| 2012/0098278 | A1 | 4/2012 | Proefke et al. |
| 2013/0089999 | A1* | 4/2013 | Martin ...................... B60L 3/00 439/345 |
| 2013/0157485 | A1* | 6/2013 | Yamamaru .......... B60L 11/1818 439/147 |

FOREIGN PATENT DOCUMENTS

| | | |
|---|---|---|
| DE | 202010012379 U1 | 2/2012 |
| EP | 2392755 A2 | 12/2011 |
| JP | 11-332024 A | 11/1999 |
| JP | 11332024 A * | 11/1999 |
| WO | 01/07738 A1 | 2/2001 |
| WO | 02/06069 A1 | 1/2002 |
| WO | 2012/043043 A1 | 4/2012 |
| WO | 2012/043044 A1 | 4/2012 |

* cited by examiner

CHARGING PORT STRUCTURE

CROSS-REFERENCE TO RELATED APPLICATIONS

This application is a U.S. National stage application of International Application No. PCT/JP2013/071939, filed Aug. 14, 2013, which claims priority to Japanese Patent Application No. 2012-205529 filed in Japan on Sep. 19, 2012. The entire disclosure of Japanese Patent Application No. 2012-205529 is hereby incorporated herein by reference.

BACKGROUND

1. Field of the Invention

The present invention relates to a charging port structure in which a locking mechanism of a port lid for covering a charging port can be unlocked by an electric actuator.

2. Background Information

A charging port structure is conventionally known in which a charging port is covered by a port lid capable of opening and closing, and the port lid can be kept closed by a locking mechanism (see Japanese Laid-Open Patent Application No. 11-332024, for example).

SUMMARY

In the conventional charging port structure, when an electric unlocking mechanism is provided for unlocking the port lid lock mechanism by an electric actuator, there is a need to make unlocking possible by a manual operation when a malfunction or other abnormality occurs in the electric actuator. However, theft prevention must be enhanced so that manual unlocking is not performed in an unauthorized manner.

The present invention was developed in view of the foregoing problems, and an object of the present invention is to provide a charging port structure whereby it is possible to suppress unlocking of a port lid lock mechanism by unauthorized manual operation and enhance theft prevention.

In order to achieve the above objective, the charging port structure of the present invention is provided with a charging port, a port lid, a port lid lock mechanism, a vehicle body opening, a body opening lid, a body opening lid lock mechanism, an electric unlocking mechanism, and a manual unlocking structure. The charging port is provided inside a port housing provided in an electric vehicle. The port lid can open and close a front opening of the port housing. The port lid lock mechanism maintains the port lid closed. The vehicle body opening is provided in a vehicle body surface in a vicinity of the charging port. The body opening lid can open and close the vehicle body opening. The body opening lid lock mechanism maintains the body opening lid closed and is unlocked by an operation from inside a passenger compartment. The electric unlocking mechanism unlocks the port lid lock mechanism by an electric actuator. The manual unlocking structure enables the port lid lock mechanism to be unlocked by a manual operation from the vehicle body opening.

In the charging port structure of the present invention, the port lid lock mechanism can be unlocked by a manual operation from the vehicle body opening by the manual unlocking structure. The port lid lock mechanism can therefore be unlocked even when unlocking by the electric unlocking mechanism is not possible due to a malfunction or other condition in the electric actuator. The vehicle body opening is also covered so as to be able to open and close by a body opening lid which is kept closed by a body opening lid lock mechanism. Here, the body opening lid lock mechanism is unlocked by an operation from inside a passenger compartment to which access is restricted by a door locking mechanism or the like. It is therefore difficult for the body opening lid lock mechanism to be unlocked by unauthorized access, and the vehicle body opening cannot easily be opened. Since the vehicle body opening cannot be opened, the port lid lock mechanism also cannot be unlocked by a manual operation from the vehicle body opening. As a result, it is possible to suppress unlocking of the port lid lock mechanism by unauthorized manual operation, and theft prevention can be enhanced.

BRIEF DESCRIPTION OF THE DRAWINGS

Referring now to the attached drawings which form a part of this original disclosure.

DETAILED DESCRIPTION OF THE EMBODIMENTS

Figure 1:
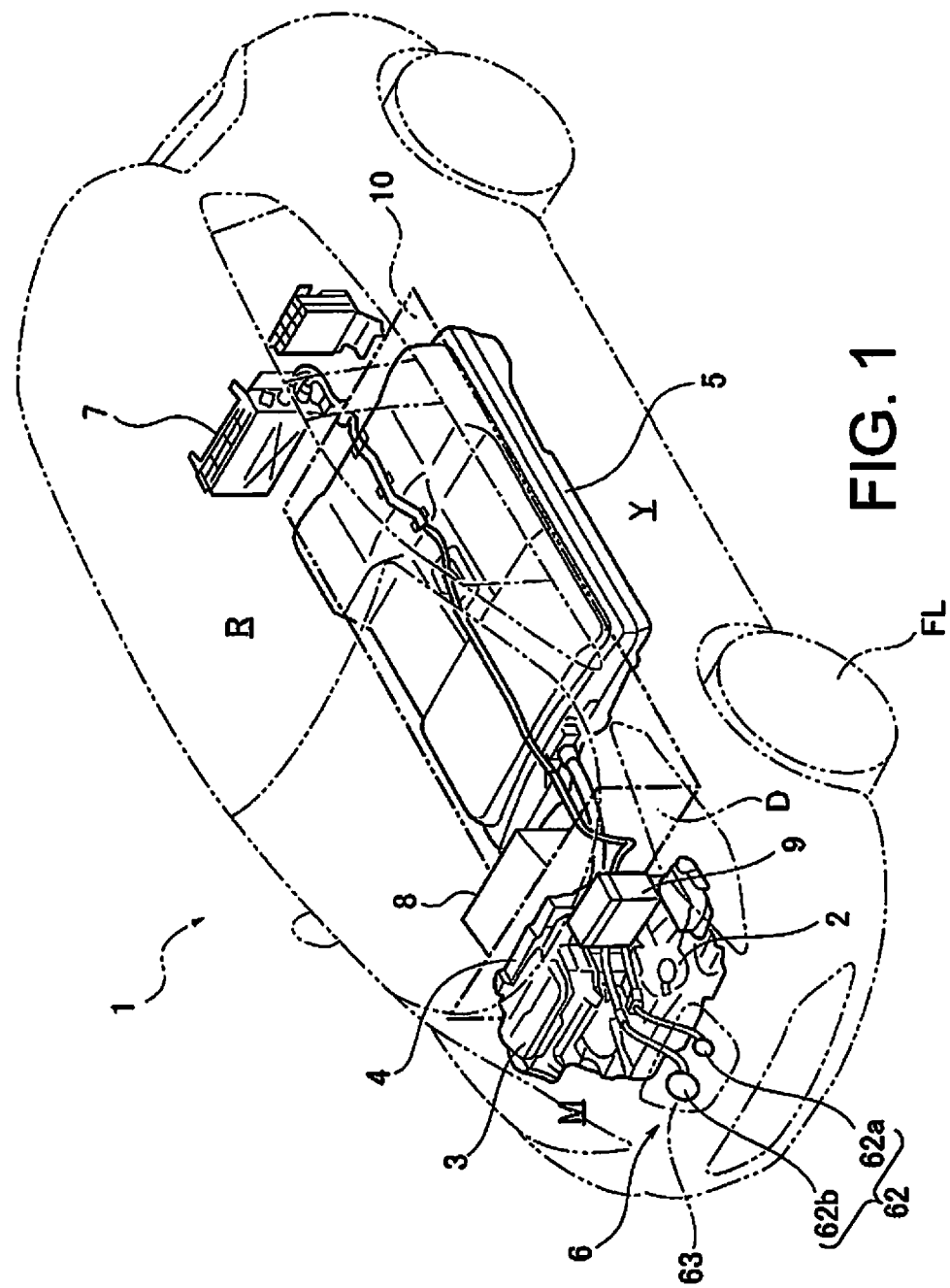
FIG. 1 is an overall perspective view illustrating the main structure of an electric vehicle to which the charging port structure in accordance with a first embodiment.

An embodiment of a charging port structure of the present invention is described below on the basis of the embodiment illustrated in the drawings.

The description of the configuration of the charging port structure of the illustrated embodiment is divided into descriptions of the "overall configuration of the electric vehicle," the "configuration of the front part of the vehicle body of the electric vehicle," the "configuration of the charging port unit," and the "configuration of the port lid lock mechanism."

Overall Configuration of the Electric Vehicle

FIG. 1 is an overall perspective view illustrating the main structure of an electric vehicle to which the charging port structure of the illustrated embodiment is applied. The overall configuration of the electric vehicle of the illustrated embodiment is described below using FIG. 1.

As illustrated in FIG. 1, the electric vehicle (electric vehicle) 1 of the illustrated embodiment is provided with a drive motor 2, a drive motor inverter 3, a DC/DC junction box 4, a battery pack 5, a charging port unit 6, an onboard charger 7, and an air conditioning unit 8. The component indicated by reference numeral 9 in FIG. 1 is a 12-volt onboard battery.

The drive motor 2 is a travel drive source for the electric vehicle 1, and is disposed in a motor compartment (drive source compartment) M provided in a vehicle front. An output shaft (not illustrated) of the drive motor 2 is connected to left and right front wheels FL, (other wheel not illustrated) which are drive wheels. The drive motor 2 performs driving action for generating a drive torque using discharged electric power from the battery pack 5 when a positive torque command is outputted to the drive motor inverter 3, and drives the left and right front wheels FL, (other wheel not illustrated) (powering). When a negative torque command is outputted to the drive motor inverter 3, an electric power generation action is performed for converting rotational energy from the left and right front wheels FL, (other wheel not illustrated) into electrical energy, and the generated electric power is used as charging electric power for the battery pack 5 (regeneration).

The DC/DC junction box 4 houses a DC/DC converter, and distributes high-voltage discharge electric power from the battery pack 5 to supply electric power to a 12-volt power source system and charge the 12-volt onboard battery 9. The DC/DC junction box 4 also has a normal charging relay and a quick charging relay, and is configured so as to be able to switch charging circuits according to charging mode.

The battery pack 5 is positioned at the center of a wheelbase under a floor panel 10 for partitioning a passenger compartment space (passenger compartment) R and an underfloor space Y, i.e., in the underfloor space Y. The battery pack 5 serves as an electric power source for the drive motor 2 and as an electric power source for a PTC heater (not illustrated) housed in the air conditioning unit 8.

The charging port unit 6 is provided at the center of the vehicle front in a location where a charging connector is connected for supplying electric power from a charging stand, household charging facility, or other outside power source. The charging port unit 6 has a charging port 62 having a normal charging port 62a and a quick charging port 62b, and an openable/closable port lid 63 for covering the charging port 62. The normal charging port 62a is a charging port used when charging by a household charging facility, a normal charging stand, or the like, and is connected to the DC/DC junction box 4 via the onboard charger 7. The quick charging port 62b is a charging port used when charging by a quick charging stand or the like, and is directly connected to the DC/DC junction box 4. The structure of the charging port unit 6 is described in detail hereinafter.

The air conditioning unit 8 is disposed above the floor panel 10, i.e., in the passenger compartment space R, further toward the front of the vehicle relative to the battery pack 5. Here, the air conditioning unit 8 is disposed between a dash panel D for partitioning the motor compartment M and the passenger compartment space R, and an instrument panel not illustrated in the drawing. The air conditioning unit 8 blows temperature conditioning air into the passenger compartment space R.

Configuration of the Front Part of the Vehicle Body of the Electric Vehicle

Figure 2:
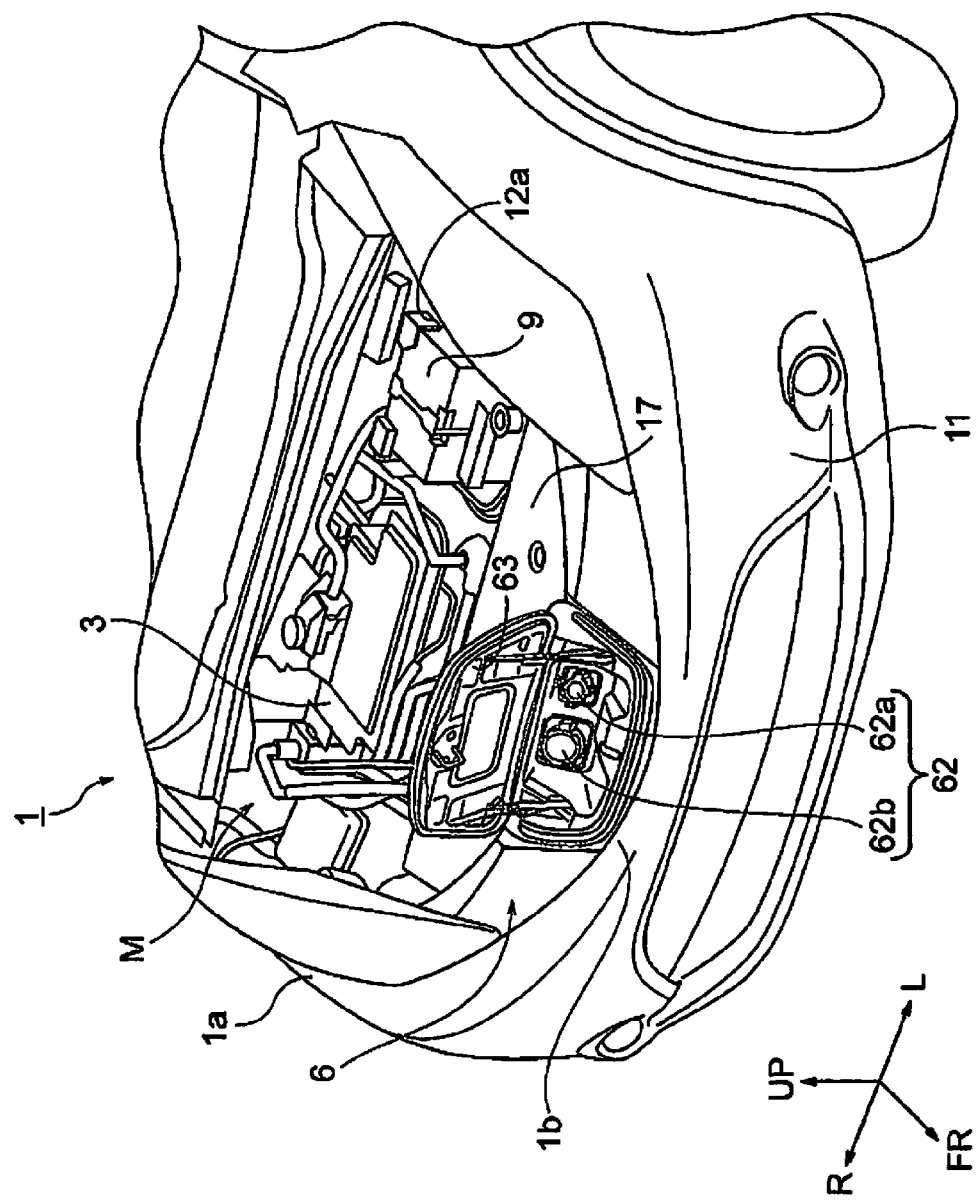
FIG. 2 is a perspective view illustrating the front part of the vehicle body of the electric vehicle of the first embodiment.
Figure 3:
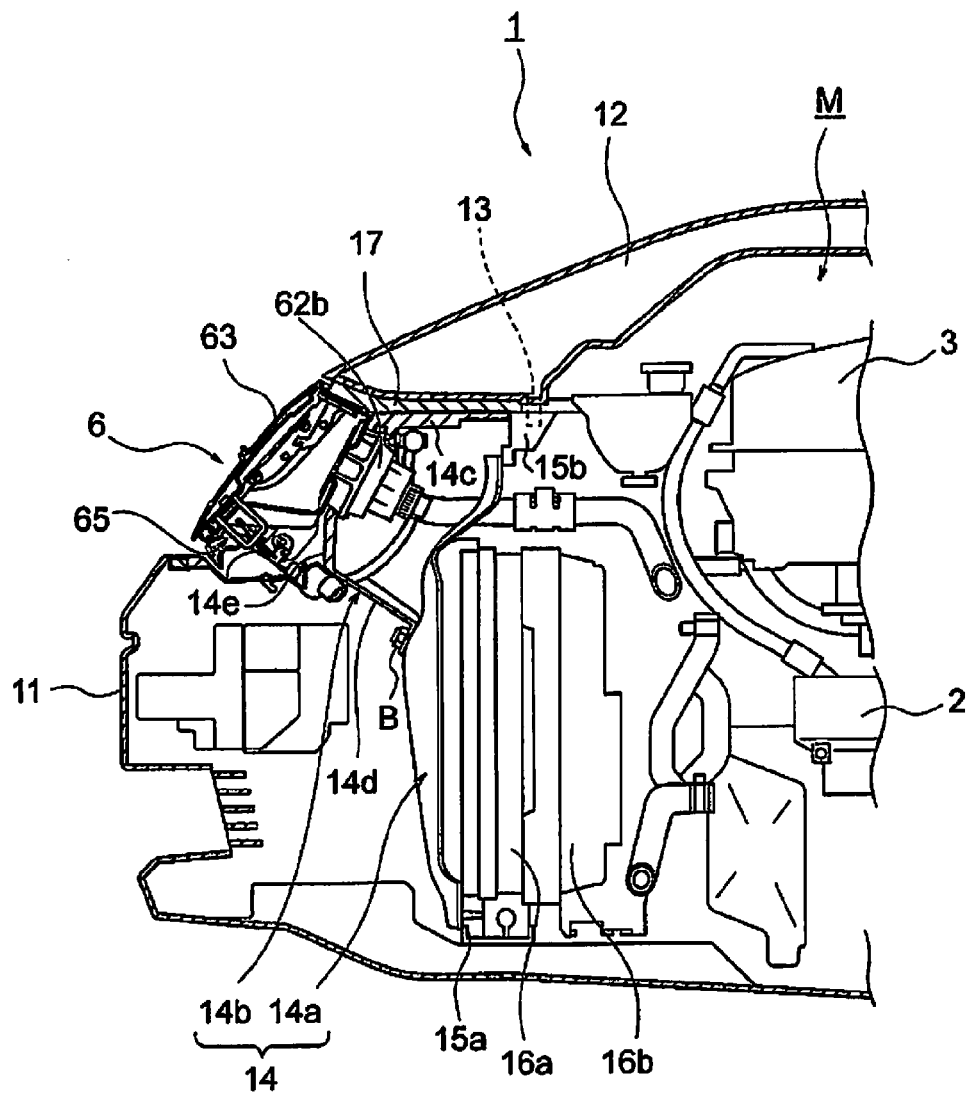
FIG. 3 is a longitudinal sectional view illustrating the front part of the vehicle body of the electric vehicle of the first embodiment.
Figure 4:
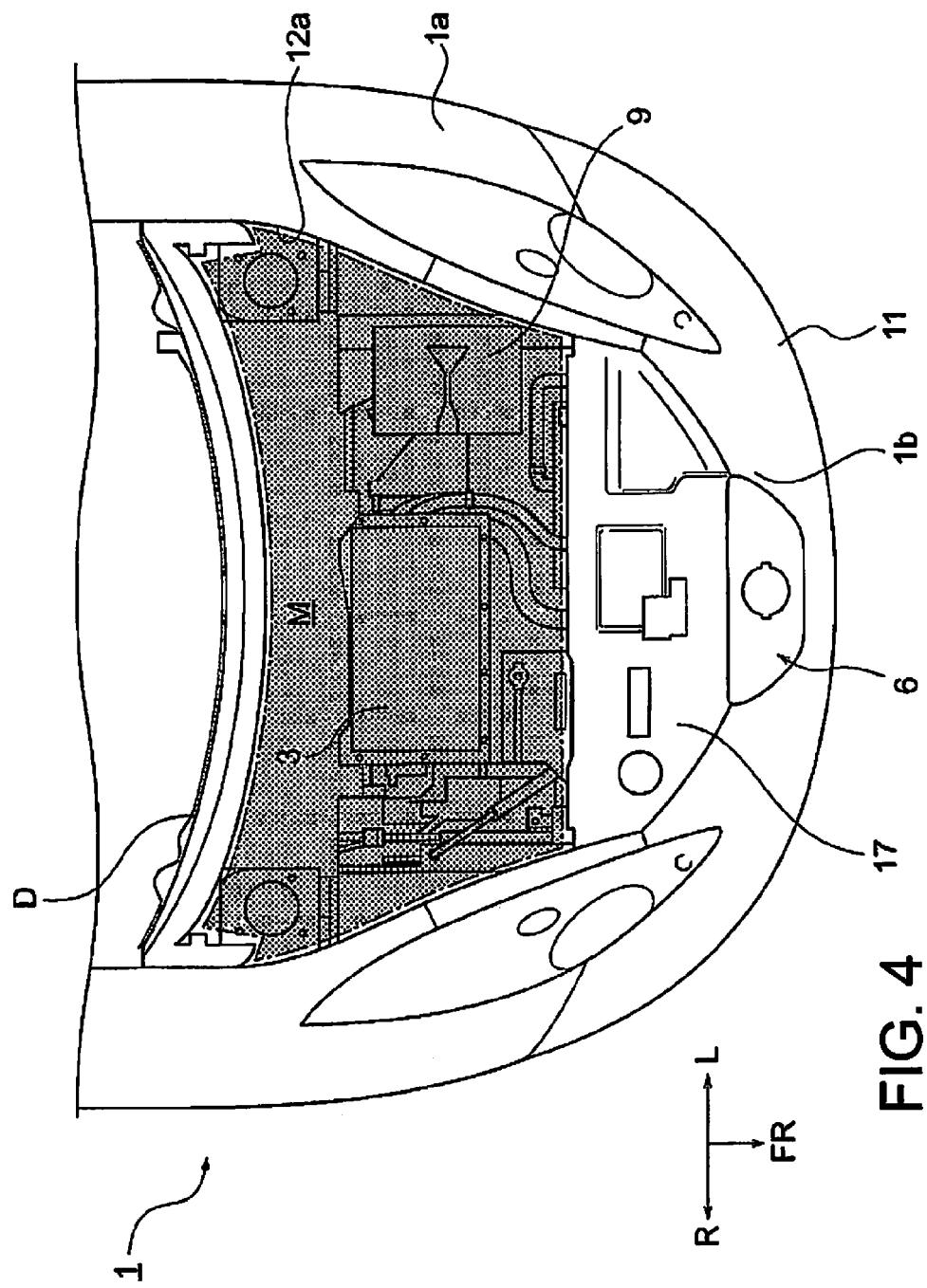
FIG. 4 is a plan view illustrating the front part of the vehicle body of the electric vehicle in a state in which the front hood is open in in accordance with the first embodiment.

FIG. 2 is a perspective view illustrating the front part of the vehicle body of the electric vehicle of the illustrated embodiment. FIG. 3 is a longitudinal sectional view illustrating the front part of the vehicle body of the electric vehicle of the illustrated embodiment. FIG. 4 is a plan view illustrating the front part of the vehicle body of the electric vehicle in a state in which the front hood is open in the illustrated embodiment. In the drawings, UP indicates the vehicle-upward direction, FR indicates the vehicle-forward direction, L indicates the vehicle-leftward direction, and R indicates the vehicle-rightward direction. The configuration of the front part of the vehicle body of the electric vehicle of the illustrated embodiment is described below using FIGS. 2 through 4.

In the electric vehicle 1 of the illustrated embodiment, the motor compartment M is formed in the front part of the vehicle body, and a bumper 11 is provided to a bottom part of a front side of the motor compartment M so as to extend along the vehicle width direction. The charging port unit 6 is disposed on a top side of the bumper 11 at a center part in the vehicle width direction thereof.

The motor compartment M is a vehicle-body internal space formed on the inside of an outer panel (vehicle body surface) 1a of the front part of the vehicle body, and has a compartment opening (vehicle body opening) 12a open in the vehicle-upward direction. The compartment opening 12a is covered so as to be openable/closable by a front hood (body opening lid, hood) 12 (see FIG. 3). A hood locking mechanism (body opening lid lock mechanism) 13 for the front hood 12 closed is provided between the compartment opening 12a and the front hood 12. The hood locking mechanism 13 can be unlocked by an operation from inside the passenger compartment space R. Here, "an operation from inside the passenger compartment space R" refers to unlocking the hood locking mechanism 13 by operating a switch or lever provided in the passenger compartment space R. The detailed configuration of the hood locking mechanism 13 is well known, and therefore will not be described herein. A door not illustrated in the drawings is further provided to the passenger compartment space R, and the passenger compartment space R can be entered by opening the door. The door can be locked by a door locking mechanism. In other words, access to the inside of the passenger compartment space R is restricted by the door locking mechanism.

The drive motor inverter 3 is disposed in a center part of the motor compartment M, and the 12-volt onboard battery 9 is provided on a vehicle-left side of the drive motor inverter 3 (see FIG. 2). As illustrated in FIG. 3, the drive motor 2 is disposed below the drive motor inverter 3, and the DC/DC junction box 4 (not illustrated) is disposed on a vehicle-rear side of the drive motor inverter 3.

As illustrated in FIG. 3, the charging port unit 6 is supported on a vehicle-front side of the motor compartment M by a charging port bracket 14 standing at the front side of the motor compartment M. The charging port bracket 14 is erected between a lower cross member 15a and an upper cross member 15b, and has a vertical retainer 14a and a support plate 14b.

The vertical retainer 14a is a framework member erected at a center part in the vehicle width direction of the lower cross member 15a. An outdoor heat exchanger 16a for exchanging heat between traveling wind and a coolant flowing through an evaporator in the air conditioning unit 8, or a fan unit 16b or the like is disposed between the vertical retainer 14a and the drive motor 2.

The support plate 14b is a framework member attached to a top part of the vertical retainer 14a. The support plate 14b has a horizontal top wall 14c, a bottom end wall 14d, and a port support wall 14e for connecting the horizontal top wall 14c and the bottom end wall 14d to each other and supporting the charging port unit 6. A distal-end part of the horizontal top wall 14c oriented in the vehicle rear direction is fixed to the upper cross member 15b. A bottom end part of the bottom end wall 14d is fixed to the vertical retainer 14a by a bolt B. Through holes (not illustrated) through which the normal charging port 62a and the quick charging port 62b each pass are also formed in the port support wall 14e.

An air guide 17 is disposed inside the compartment opening 12a. The air guide 17 restricts the flow direction of air flowing through the motor compartment M and prevents the inside of the motor compartment M from being exposed to the outside. The air guide 17 is detachably mounted to the top side of the horizontal top wall 14c, and as illustrated in FIG. 4, the air guide 17 covers a front portion of the compartment opening 12a in the vicinity of the charging port unit 6.

Configuration of the Charging Port Unit

Figure 5:
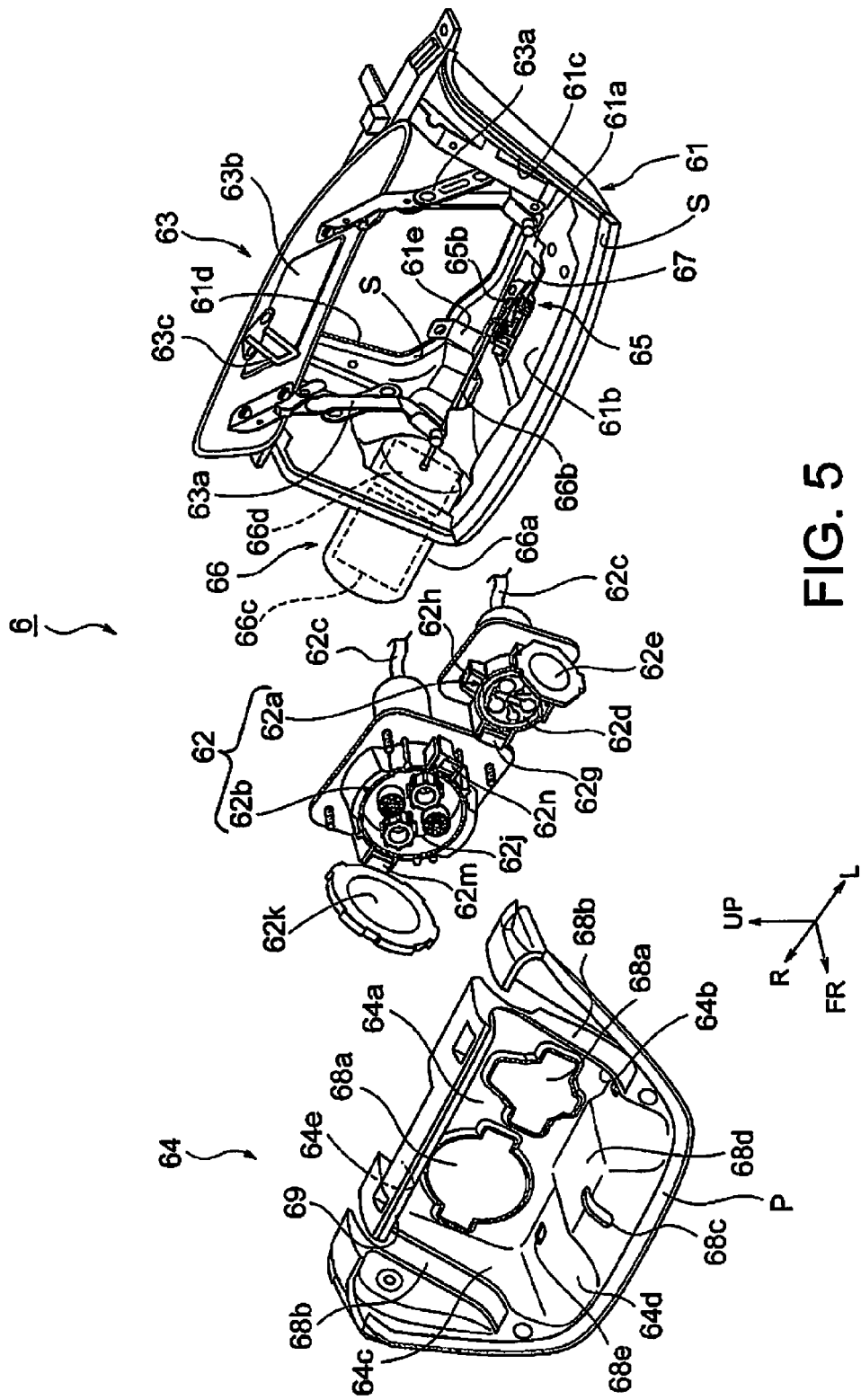
FIG. 5 is an exploded perspective view illustrating the charging port unit in a state in which the port lid is open in accordance with the first embodiment.
Figure 6:
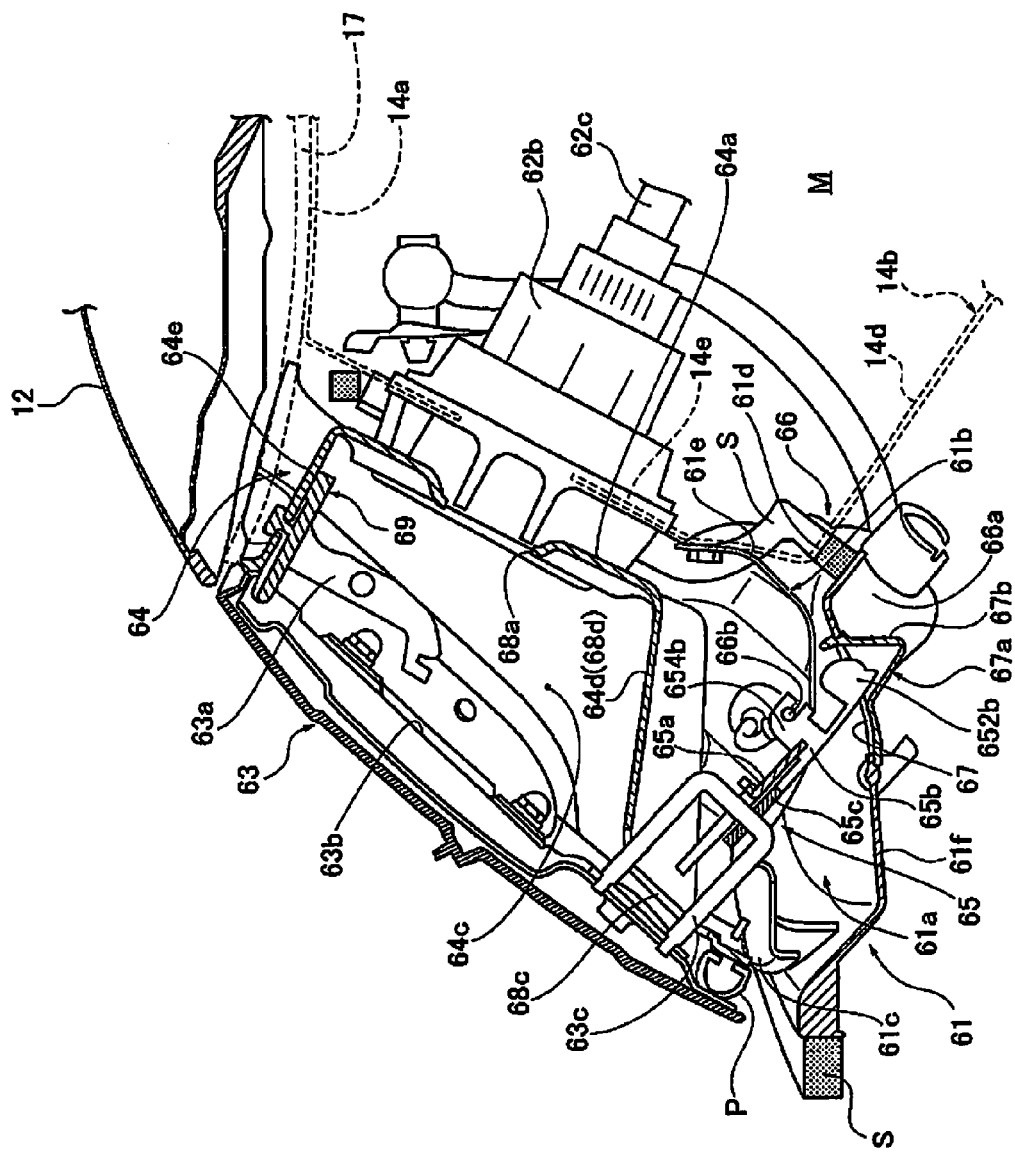
FIG. 6 is a longitudinal sectional view illustrating the charging port unit of the first embodiment.
Figure 7A:
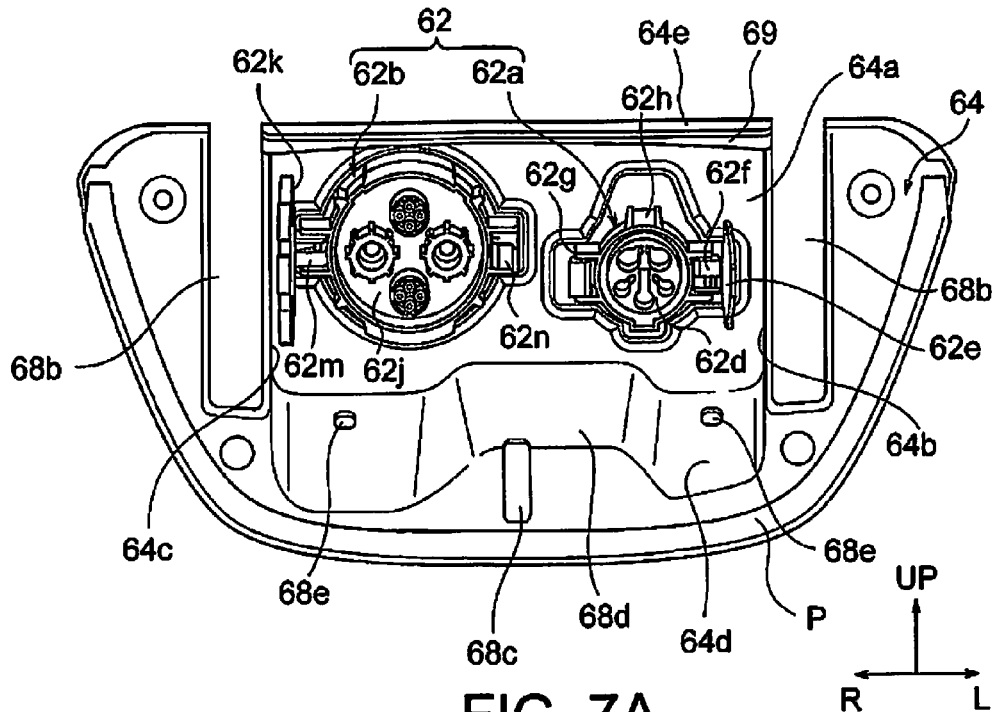
FIG. 7A is a front view illustrating the inside of a port housing in a state in which the port cap is open.
Figure 7B:
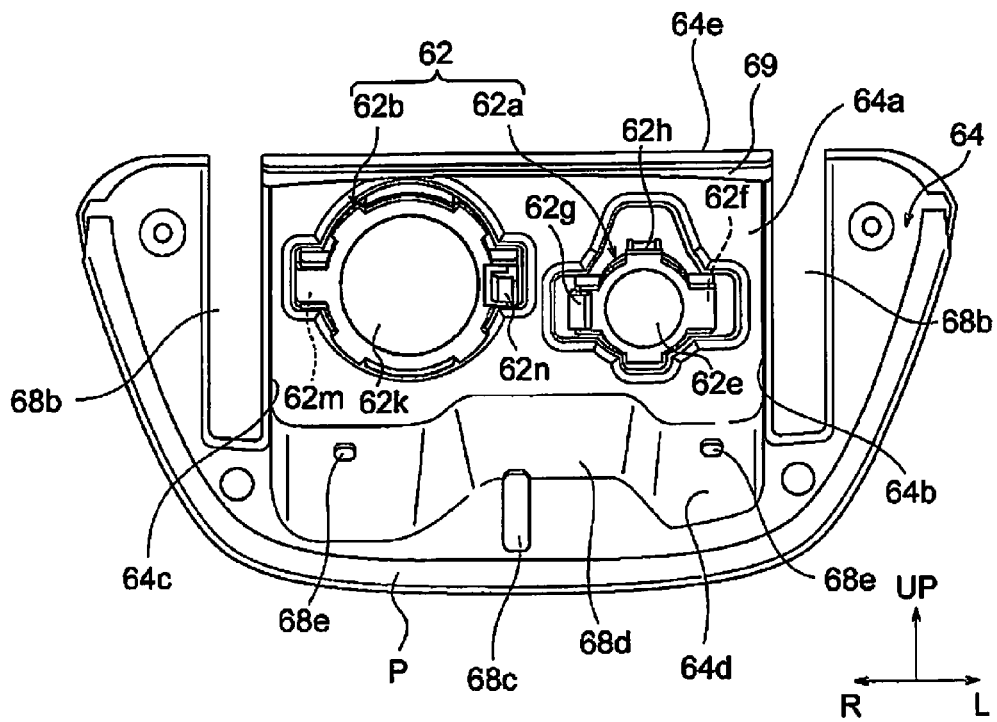
FIG. 7B is a front view illustrating the inside of the port housing in a state in which the port cap is closed.
Figure 8:
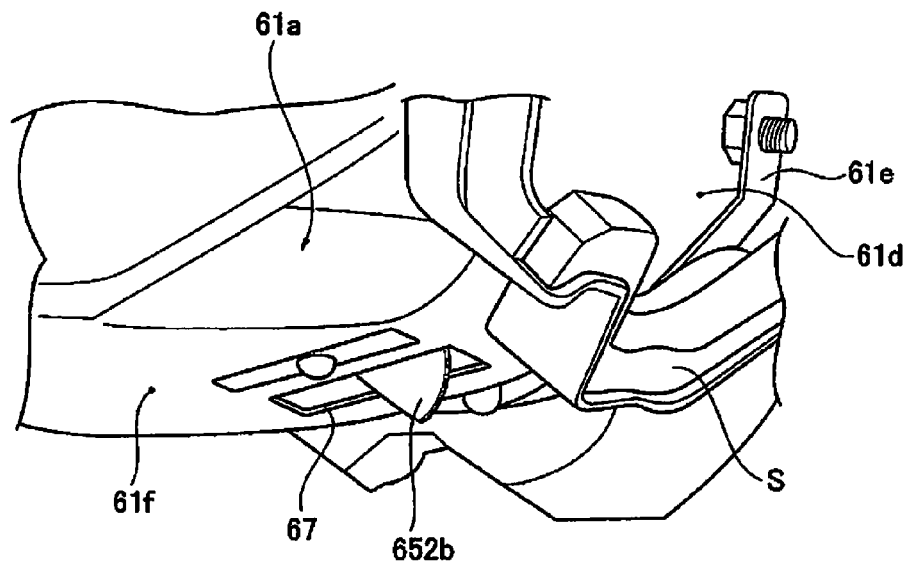
FIG. 8 is a perspective view illustrating relevant parts of the port housing of the illustrated embodiment.

FIG. 5 is an exploded perspective view illustrating the charging port unit in a state in which the port lid is open in the illustrated embodiment. FIG. 6 is a longitudinal sectional view illustrating the charging port unit of the illustrated embodiment. FIG. 7A is a front view illustrating the inside of a port housing in a state in which a port cap is open, and FIG. 7B is a front view illustrating the inside of the port housing in a state in which the port cap is closed. FIG. 8 is a perspective view illustrating relevant parts of the port housing of the illustrated embodiment. In the drawings, UP indicates the vehicle-upward direction, FR indicates the vehicle-forward direction, L indicates the vehicle-leftward direction, and R indicates the vehicle-rightward direction. The configuration of the charging port unit is described below using FIGS. 5 through 8.

As illustrated in FIGS. 5 and 6, the charging port unit 6 has a port housing 61, the charging port 62, the port lid 63, a port cover 64, a port lid lock mechanism 65, an electric unlocking mechanism 66, and an access opening 67.

The port housing 61 has a housing main body 61a for partitioning the motor compartment M and the charging port unit 6, and a bracket plate 61b for fixing the housing main body 61a to the support plate 14b of the charging port bracket 14. Here, the bracket plate 61b is fixed to the vehicle-front side of the support plate 14b, and the port housing 61 is therefore provided to a vehicle-body front end 1b (see FIG. 2) of the electric vehicle 1. The front portion of the compartment opening 12a is covered by the air guide 17 disposed on the inside of the compartment opening 12a, and the housing main body 61a for partitioning the motor compartment M and the charging port unit 6 is therefore also covered by the air guide 17. The port housing 61 is thereby disposed in a region further toward the front of the vehicle than the visible range of view obtainable when looking into the compartment opening 12a. Here, "the visible range of view obtainable when looking into the compartment opening 12a" is the viewable range from the direction in which the compartment opening 12a opened in the vehicle-upward direction is open, i.e., from above the vehicle, and is a range (inside of the open region) facing the compartment opening 12a. Specifically, since the air guide 17 is disposed in the compartment opening 12a, the "visible range of view obtainable" in the illustrated embodiment is the range of the compartment opening 12a not covered by the air guide 17 (the region surrounded by a dashed-dotted line in FIG. 4).

The housing main body 61a has a forward opening part (front surface opening part) 61c open in the vehicle-forward direction, and a rear opening part 61d open in the vehicle rear direction and faced by the port support wall 14e of the support plate 14b, and is a concave-shaped housing recessed into the motor compartment M. The charging port 62 is disposed on the inside of the housing main body 61a, and the port cover 64 is fitted and fixed therein from the forward opening part 61c side thereof. A cushioning member S is provided on the periphery of the forward opening part 61c and on the periphery of the rear opening part 61d. The bracket plate 61b is fixed to the inside of the housing main body 61a, and is bolted to the port support wall 14e via a pair of bracket parts 61e, 61e extending to the inside of the rear opening part 61d. The port lid lock mechanism 65 is fixed to the bracket plate 61b.

The charging port 62 has the normal charging port 62a and the quick charging port 62b, and the two charging ports 62a, 62b are arranged close together in the vehicle width direction (transverse direction). Each of the charging ports 62a, 62b is inserted in a through hole formed in the port support wall 14e of the support plate 14b and is bolted to the port support wall 14e. A charging harness 62c is extended toward the rear of the vehicle from each of the two charging ports 62a, 62b.

The normal charging port 62a is disposed on the vehicle left side, and an end connection 62d for connecting a normal charging connector (not illustrated) is covered by a port cap 62e so as to be able to open and close, as illustrated in FIGS. 7A and 7B. The port cap 62e pivots toward the vehicle left side about a hinge part 62f provided at a position along a peripheral edge part of the end connection 62d in the vicinity of a left cover lateral surface 64b of the port cover 64. Here, the port cap 62e is constantly urged in the opening direction by a spring (not illustrated) provided to the hinge part 62f. At a position along the peripheral edge part of the end connection 62d in the vicinity of the center part in the width direction of the port cover 64, a release lever 62g for engaging with the port cap 62e is provided. When the release lever 62g is disengaged from the port cap 62e, the port cap 62e is pivoted by the urging force of the spring, and the end connection 62d of the normal charging port 62a opens. A connector engagement recess 62h with which a normal charging connector engages when the normal charging connector is connected is formed in a top part of the end connection 62d. The connector engagement recess 62h is provided to prevent mischief (e.g., on a whim, attempting to pull out the charging connector while passing by).

The quick charging port 62*b* is disposed on the vehicle right side, and an end connection 62*j* for connecting a quick charging connector (not illustrated) is covered by a port cap 62*k* so as to be able to open and close, as illustrated in FIGS. 7A and 7B. The port cap 62*k* pivots toward the vehicle right side about a hinge part 62*m* provided at a position along a peripheral edge part of the end connection 62*j* in the vicinity of a right cover lateral surface 64*c* of the port cover 64. Here, the port cap 62*k* is constantly urged in the opening direction by a spring (not illustrated) provided to the hinge part 62*m*. At a position along the peripheral edge part of the end connection 62*j* in the vicinity of the center part in the width direction of the port cover 64, a release lever 62*n* for engaging with the port cap 62*k* is provided. When the release lever 62*n* is disengaged from the port cap 62*k*, the port cap 62*k* is pivoted by the urging force of the spring, and the end connection 62*j* of the normal charging port 62*b* opens.

The port lid 63 is supported by the bracket plate 61*b* of the port housing 61 via a pair of port lid hinges 63*a*, 63*a*, and covers the forward opening part 61*c* of the housing main body 61*a* so as to be able to open and close. The port lid 63 is shaped so that the surface shape thereof conforms to the front hood 12, and when the forward opening part 61*c* is open, the degree of opening of the lid is maintained by the port lid hinge 63*a*. A striker 63*c* is provided to an inside surface 63*b* of the port lid 63, i.e., to a surface of the port lid 63 facing the inside of the port housing 61.

As illustrated in FIG. 5, the port cover 64 exhibits a concave shape capable of fitting inside the port housing 61, and is integrally fixed to the housing main body 61*a* of the port housing 61 by a fixing means not illustrated in the drawing. The port cover 64 has a cover back surface 64*a* for covering the rear opening part 61*d*, left and right cover lateral surfaces 64*b*, 64*c*, a cover bottom surface 64*d*, and a cover top surface 64*e*. A parting seal P for enhancing seal properties at a closure position of the port lid 63 is provided on the external periphery of a front opening of the port cover 64 open in the vehicle-forward direction. The parting seal P causes the port lid 63 to pop up by a restorative elastic force when the port lid 63 locked by the port lid lock mechanism 65 is unlocked. The parting seal P is not provided on the top side of the front opening.

A pair of port passage openings 68*a*, 68*a* through which the normal charging port 62*a* and the quick charging port 62*b* penetrate is formed in the cover back surface 64*a*. A port lamp not shown in the drawing for illuminating the inside of the port housing 61 is also provided at a center part in the vehicle width direction of the cover back surface 64*a*.

The left and right cover lateral surfaces 64*b*, 64*c* extend in the vehicle-forward direction from left and right end parts of the cover back surface 64*a*, respectively, and cover both flanks of the charging port 62. Hinge insertion slits 68*b* through which the port lid hinges 63*a*, 63*a* penetrate are formed in the left and right cover lateral surfaces 64*b*, 64*c*.

The cover bottom surface 64*d* extends in the vehicle-forward direction from a bottom end part of the cover back surface 64*a*, and covers from below the charging port 62. An elevated part 68*d* having a striker groove 68*c* in which the striker 63*c* is inserted, and a pair of drain holes 68*e*, 68*e* are formed in the cover bottom surface 64*d*. Here, the elevated part 68*d* is formed in a center part in the vehicle width direction, and the pair of drain holes 68*e*, 68*e* is formed on the two sides thereof.

The cover top surface 64*e* extends in the vehicle-forward direction from a top end part of the cover back surface 64*a* and, and covers from above the charging port 62. A guide plate 69 extending in the vehicle width direction is provided on the bottom side of the cover top surface 64*e*. Here, the guide plate 69 protrudes past the cover top surface 64*e* in the vehicle-forward direction, and is retained so that there is a gap between the cover top surface 64*e* and the guide plate 69 (see FIG. 6). The cover top surface 64*e* and the guide plate 69 are also tilted so that the vehicle-front sides thereof are positioned higher than the vehicle-rear sides thereof. The guide plate 69 receives water that flows into the port housing 61 from the periphery of the port lid 63 and guides the water toward the left and right cover lateral surfaces 64*b*, 64*c*.

The port lid lock mechanism 65 engages with the striker 63*c* in the closure position of the port lid 63 and maintains the port lid 63 closed. The port lid lock mechanism 65 is provided in an inside bottom part of the port housing 61 and positioned so as to be surrounded by the elevated part 68*d* of the port cover 64. The detailed configuration of the port lid lock mechanism 65 is described hereinafter.

The electric unlocking mechanism 66 is provided on a side part of the port housing 61, and unlocks the port lid lock mechanism 65 by the an electric actuator 66*a*. The electric unlocking mechanism 66 has the electric actuator 66*a* and a wire 66*b*.

The electric actuator 66*a* penetrates through and is fixed to a right lateral surface of the housing main body 61*a* of the port housing 61, and a portion thereof protrudes into the motor compartment M. Specifically, the electric unlocking mechanism 66 is disposed inside the motor compartment M, which is a vehicle-body internal space provided to the electric vehicle 1. The electric actuator 66*a* is configured by housing a motor 66*c* and a reel mechanism 66*d* inside a waterproof case. The motor 66*c* activates on the basis of an operation command from a switch provided in the passenger compartment space R or a switch provided to a smart key, and causes the reel mechanism 66*d* to rotate. One end of the wire 66*b* is connected to the reel mechanism 66*d* in the electric actuator 66*a*, and the other end is connected to a wire connection part 654*b* formed on a lever 65*b* of the port lid lock mechanism 65. The wire 66*b* is wound onto the reel mechanism 66*d* by the driving of the motor 66*c* in the electric actuator 66*a*, and pulls on the lever 65*b*.

The access opening 67 is formed by making a rectangular cutout in a bottom surface 61*f* facing in the vehicle-downward direction in the housing main body 61*a* of the port housing 61, and is set in a region not directly visible from the compartment opening 12*a*. Here, the "region not directly visible" is a region hidden by shadows or bottom sides of other components disposed in the motor compartment M, that cannot be seen when the compartment opening 12*a* is viewed from above the vehicle. The "region not directly visible" includes, for example, a range that is not visible when viewed from above the vehicle but can be seen when looked into using a mirror, camera, or the like.

The access opening 67 enables the port lid lock mechanism 65 to be accessed from the compartment opening 12*a*. Here, "access" means a manual unlocking operation of the port lid lock mechanism 65 by an operator. The access opening 67 thereby corresponds to a manual unlocking structure for enabling the port lid lock mechanism 65 to be unlocked by a manual operation.

A lid member 67*a* for pivoting outside the port housing 61, i.e., toward the motor compartment M, is further provided on the access opening 67. When manually pulled in the vehicle-downward direction, the lid member 67*a* pivots in the vehicle-downward direction about a vehicle-front portion thereof and opens the access opening 67.

As illustrated in FIG. 8, a manual operation part 652*b* of the lever 65*b* of the port lid lock mechanism 65 protrudes from the access opening 67 to the outside of the port housing 61, i.e., into the motor compartment M. Here, the lid member 67a has a projection 67b protruding toward the motor compartment M so as to accommodate the shape of the manual operation part 652b in order to avoid interfering with the manual operation part 652b protruding from the access opening 67 (see FIG. 6).

Configuration of the Port Lid Lock Mechanism

Figure 9A:
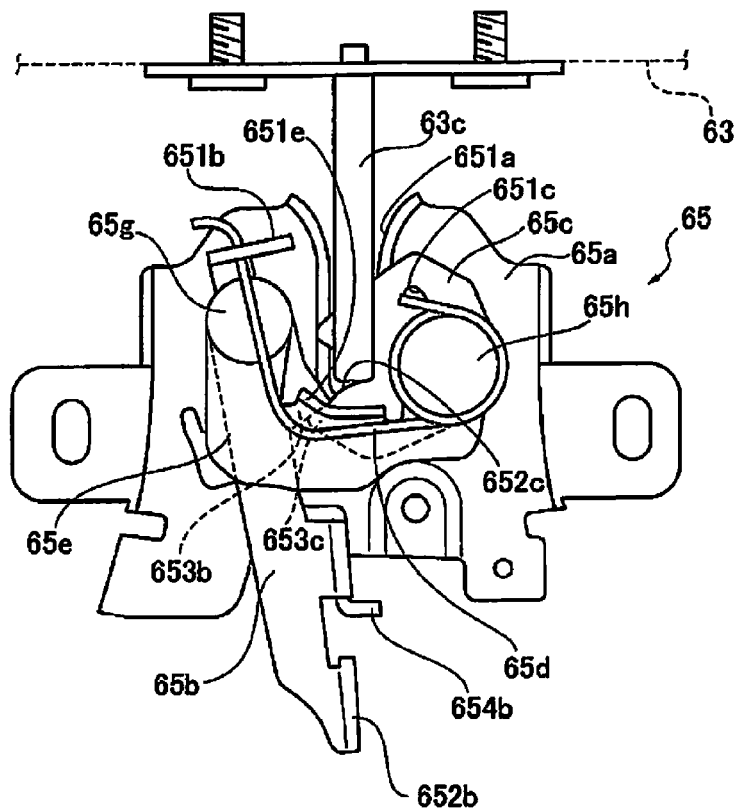
FIG. 9A is a plan view, from beneath the vehicle, of the port lid lock mechanism in a state in which the striker is locked.
Figure 9B:
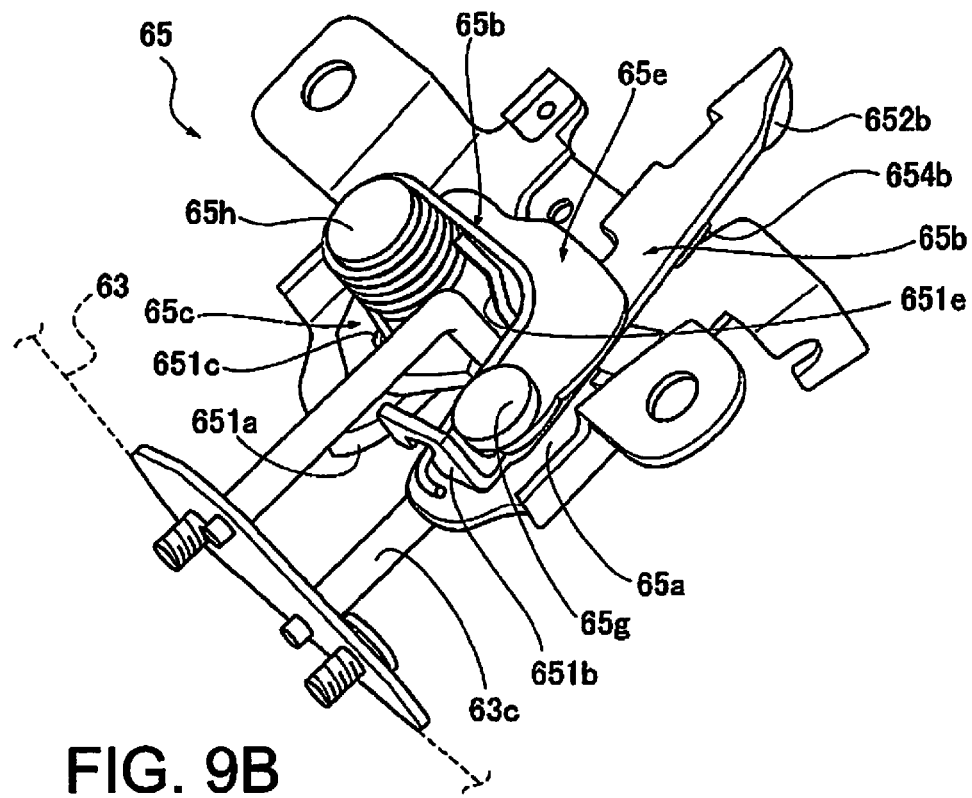
FIG. 9B is a perspective view, from beneath the vehicle, of the port lid lock mechanism in a state in which the striker is locked.

FIGS. 9A and 9B are views illustrating the port lid lock mechanism in a state in which the striker is locked. FIG. 9A is a plan view from beneath the vehicle, and FIG. 9B is a perspective view from beneath the vehicle. The configuration of the port lid lock mechanism will be described below using FIGS. 9A and 9B.

As illustrated in FIG. 9A, the port lid lock mechanism 65 has an attachment cover 65a, a lever 65b, a rotary member 65c, an urging spring 65d, and a retaining plate 65e.

The attachment cover 65a is bolted to the bracket plate 61b of the port housing 61, and covers the lever 65b and other components of the port lid lock mechanism 65. The attachment cover 65a faces the striker groove 68c and has a striker entry 651a into which the striker 63c is inserted.

The lever 65b is a long member attached to the attachment cover 65a so as to be able to pivot about a first shaft 65g. The lever 65b has a spring fixing part 651b, the manual operation part 652b, a rotary member contacting part 653b, and the wire connection part 654b. The spring fixing part 651b is a portion to which one end of the urging spring 65d is fixed, and is formed on one end of the lever 65b. The manual operation part 652b protrudes into the motor compartment M from the access opening 67 formed in the port housing 61, and is a portion for enabling the lever 65b to be pivoted by a manual operation by an operator. The manual operation part 652b is formed on the other end of the lever 65b. The rotary member contacting part 653b is a portion which touches the rotary member 65c, and is formed between the first shaft 65g and the manual operation part 652b. The wire connection part 654b is a portion to which the wire 66b of the electric unlocking mechanism 66 is connected, and is formed between the rotary member contacting part 653b and the manual operation part 652b.

The rotary member 65c is a disc-shaped member attached to the attachment cover 65a so as to be able to pivot about a second shaft 65h. The rotary member 65c has a spring fixing part 651c, a striker engaging part 652c, and a lever contacting part 653c. The spring fixing part 651c is a portion to which the other end of the urging spring 65d is fixed. The striker engaging part 652c is a portion for interposing the striker 63c, and is formed by cutting a U-shaped portion out of a peripheral edge part of the rotary member 65c. The lever contacting part 653c is a portion for touching the lever 65b, and is formed in a portion of the peripheral edge part of the rotary member 65c.

The urging spring 65d is a spring for constantly urging the lever 65b in left-handed rotation (in the counterclockwise direction) in FIG. 9A, and, at the same time, constantly urging the rotary member 65c in right-handed rotation (in the clockwise direction) in FIG. 9A. Specifically, the lever 65b and the rotary member 65c are urged by the urging spring 65d in the direction of touching each other. As described above, one end of the urging spring 65d is fixed to the lever 65b, the other end thereof is fixed to the rotary member 65c, and the middle part thereof is wound on the second shaft 65h.

The retaining plate 65e is a plate member for retaining the lever 65b and the rotary member 65c between the retaining plate 65e and the attachment cover 65a. A restricting part 651e for restricting the urging spring 65d is formed in a middle part of the retaining plate 65e.

The following description of actions in the charging port structure of the illustrated embodiment is divided into descriptions of the "port lid locking action," the "port lid electric unlocking action," the "port lid manual unlocking action," "arrangement of the manual unlocking structure," and "arrangement of the electric unlocking mechanism."

Port Lid Locking Action

Figure 10A:
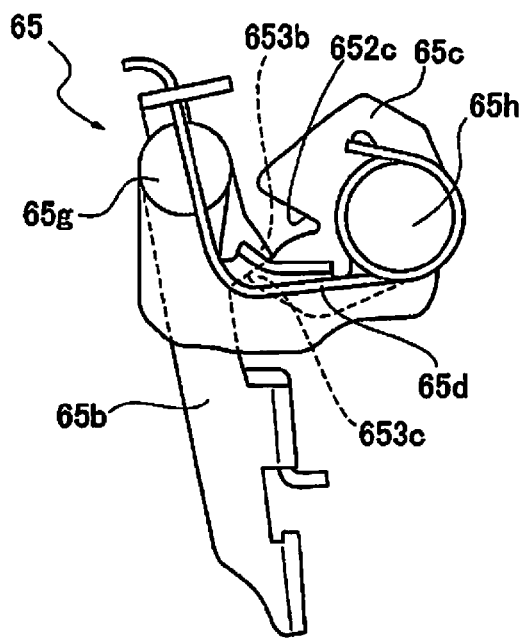
FIG. 10A is a plan view illustrating the action of the port lid lock mechanism during locking of the port lid, illustrating a state prior to insertion of the striker.
Figure 10B:
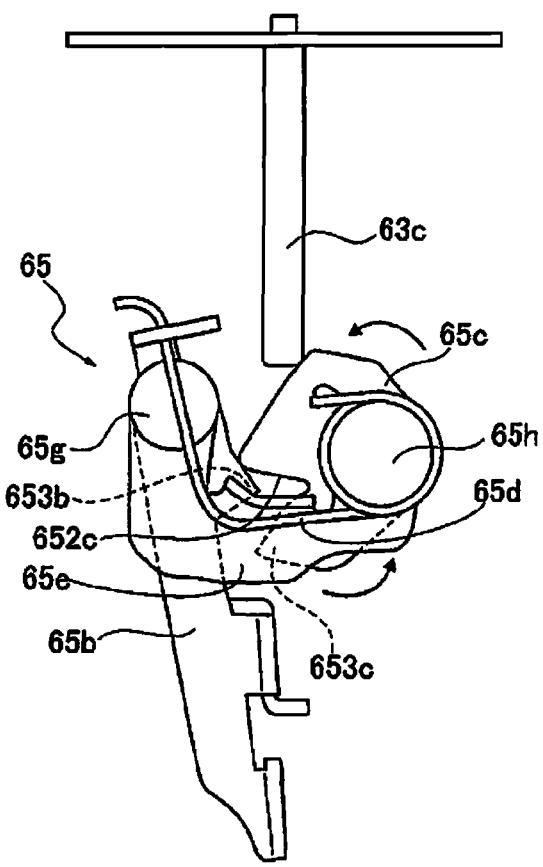
FIG. 10B is a plan view illustrating the action of the port lid lock mechanism during locking of the port lid, illustrating a state in which the striker is being inserted.
Figure 10C:
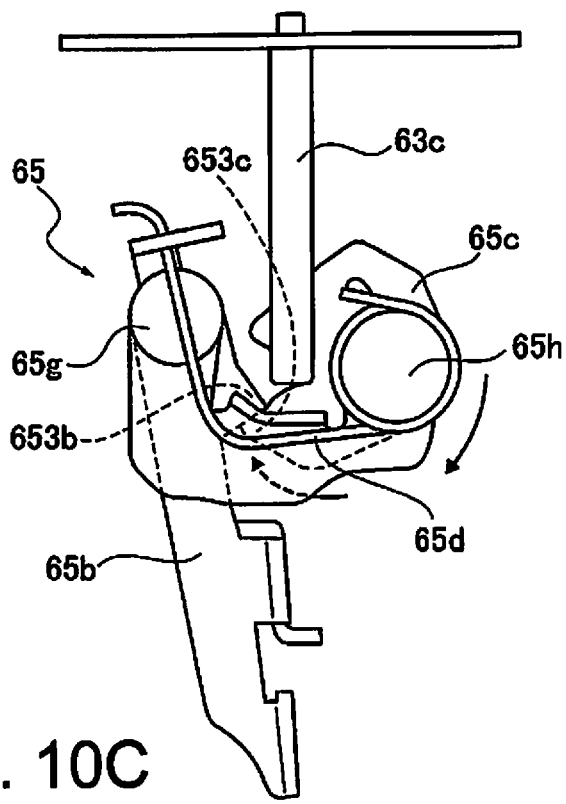
FIG. 10C is a plan view illustrating the action of the port lid lock mechanism during locking of the port lid, illustrating a state after the striker is engaged.

FIGS. 10A through 10C are views illustrating the activity of the port lid lock mechanism during locking of the port lid. FIG. 10A illustrates a state prior to insertion of the striker, FIG. 10B illustrates a state in which the striker is being inserted, and FIG. 10C illustrates a state after the striker is engaged. The port lid locking action is described below using FIGS. 10A through 10C.

In the charging port structure of the illustrated embodiment, when the port lid 63 is closed, the striker 63c is inserted in the striker groove 68c and the striker entry 651a, and the rotary member 65c is engaged in the striker 63c, whereby the port lid 63 is kept closed.

In the port lid lock mechanism 65 as illustrated in FIG. 10A, before the striker 63c is inserted, the rotary member contacting part 653b of the lever 65b and the lever contacting part 653c of the rotary member 65c are retained in a state of contact by the urging force of the urging spring 65d.

As the striker 63c is inserted, the striker 63c touches the vicinity of the striker engaging part 652c of the rotary member 65c. The rotary member 65c is thereby rotated left-handedly (in the counterclockwise direction) in FIG. 10B about the second shaft 65h against the urging force of the urging spring 65d. The lever contacting part 653c of the rotary member 65c then separates from the rotary member contacting part 653b of the lever 65b. However, at the same time that separation of the lever contacting part 653c occurs, a peripheral part of the striker engaging part 652c of the rotary member 65c comes in contact with the lever 65b. A state in which the lever 65b does not pivot is therefore maintained.

Once the striker 63c has entered between the lever 65b and the rotary member 65c, the striker 63c continues to insert. When the striker 63c enters the inside of the striker engaging part 652c of the rotary member 65c, there is no longer contact between the striker 63c and the rotary member 65c. The rotary member 65c is thereby rotated right-handedly (in the clockwise direction) in FIG. 10C about the second shaft 65h by the urging force of the urging spring 65d.

At this time, the lever contacting part 653c is in contact with the lever 65b at substantially the same time that the rotary member 65c is rotating, and a state in which the lever 65b does not pivot therefore continues to be maintained. Because the rotary member 65c is in contact with the rotary member contacting part 653b of the lever 65b, further rotation thereof is prevented. As a result, the state of engagement with the striker 63c is maintained, the striker 63c is engaged with the port lid lock mechanism 65, and the port lid 63 is kept closed.

Port Lid Electric Unlocking Action

Figure 11A:
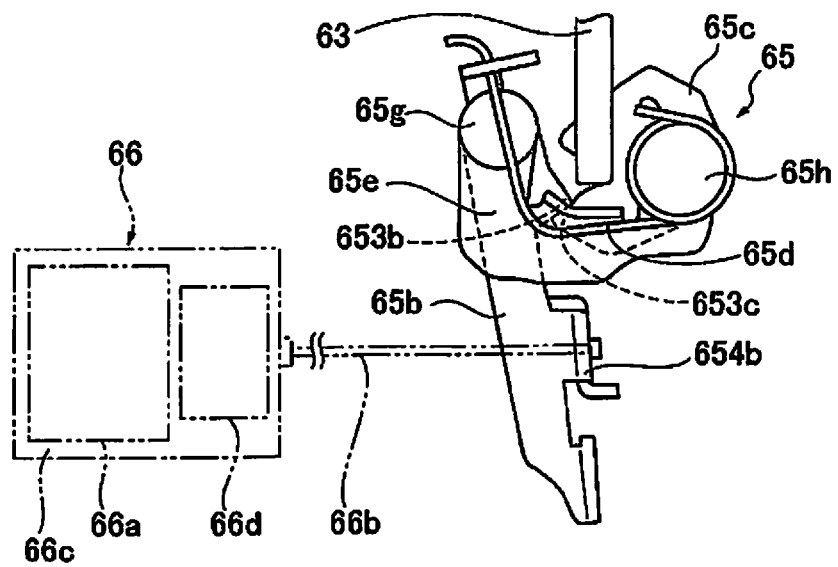
FIG. 11A is a plan view illustrating the action of the port lid lock mechanism during unlocking by the electric unlocking mechanism, illustrating a state prior to unlocking.
Figure 11B:
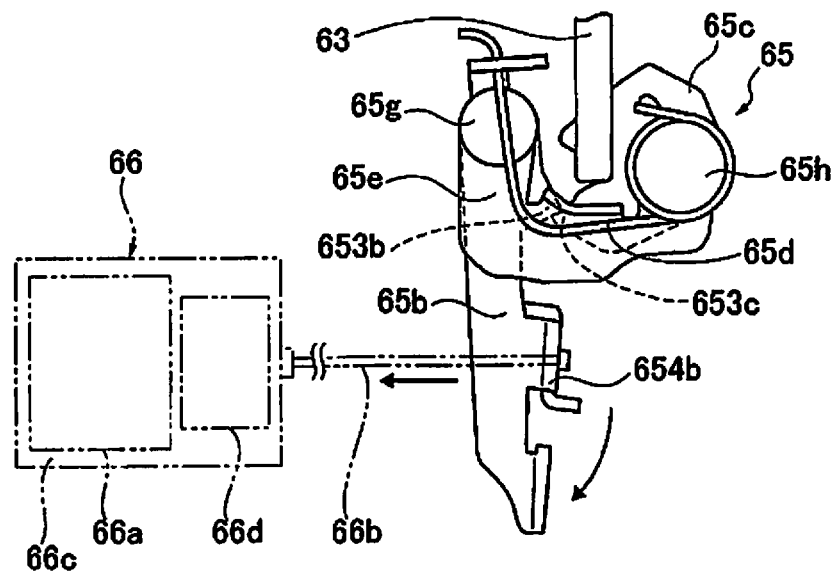
FIG. 11B is a plan view illustrating the action of the port lid lock mechanism during unlocking by the electric unlocking mechanism, illustrating a state in which unlocking is in progress.
Figure 11C:
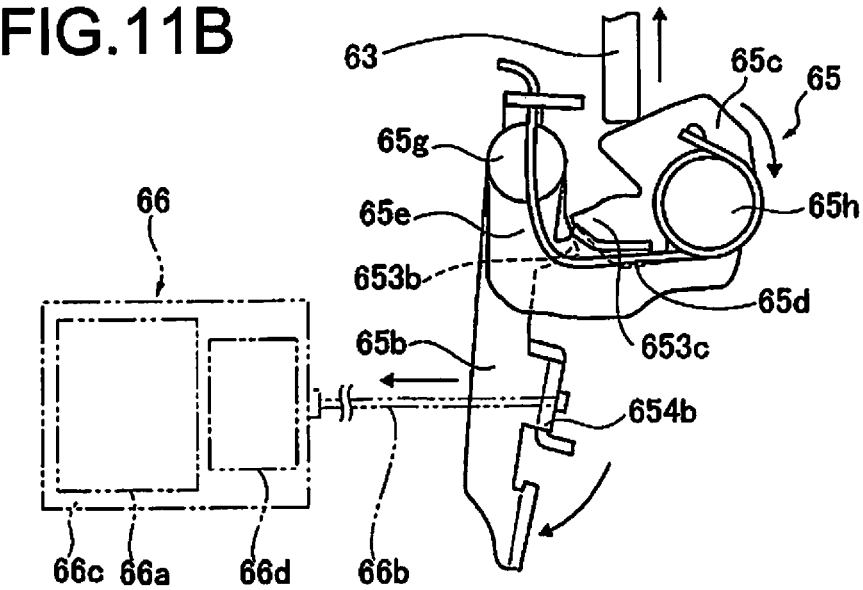
FIG. 11C is a plan view illustrating the action of the port lid lock mechanism during unlocking by the electric unlocking mechanism, illustrating a state immediately after unlocking.

FIGS. 11A through 11C are views illustrating the activity of the port lid lock mechanism during unlocking by the electric unlocking mechanism. FIG. 11A illustrates a state prior to unlocking, FIG. 11B illustrates a state in which unlocking is in progress, and FIG. 11C illustrates a state immediately after unlocking. The port lid electric unlocking action is described below using FIGS. 11A through 11C.

As illustrated in FIG. 11A, in the port lid lock mechanism 65 of the illustrated embodiment, the other end of the wire 66b, one end of which is connected to the electric actuator 66a of the electric unlocking mechanism 66, is connected to the wire connection part 654b of the lever 65b. When an operation command from an external switch is inputted to the motor 66c in the electric actuator 66a, the motor 66c activates and causes the reel mechanism 66d to rotate.

The wire 66b is thereby wound onto the reel mechanism 66d, and, as illustrated in FIG. 11B, the lever 65b rotates right-handedly (in the clockwise direction) in FIG. 11B about the first shaft 65g. In the state illustrated in FIG. 11B, the rotary member contacting part 653b of the lever 65b and the lever contacting part 653c of the rotary member 65c are in contact, and a state in which the rotary member 65c does not pivot is therefore maintained.

As illustrated in FIG. 11C, the wire 66b is further wound, and when contact between the rotary member contacting part 653b of the lever 65b and the lever contacting part 653c of the rotary member 65c is removed, i.e., when the rotary member 65c separates from the lever 65b, the rotary member 65c is rotated right-handedly (in the clockwise direction) in FIG. 11C about the second shaft 65h by the urging force of the urging spring 65d.

Engagement between the rotary member 65c and the striker 63c is thereby removed, and the port lid 63 pops up due to the restorative elastic force of the parting seal P provided to the port cover 64.

Port Lid Manual Unlocking Action

Figure 12A:
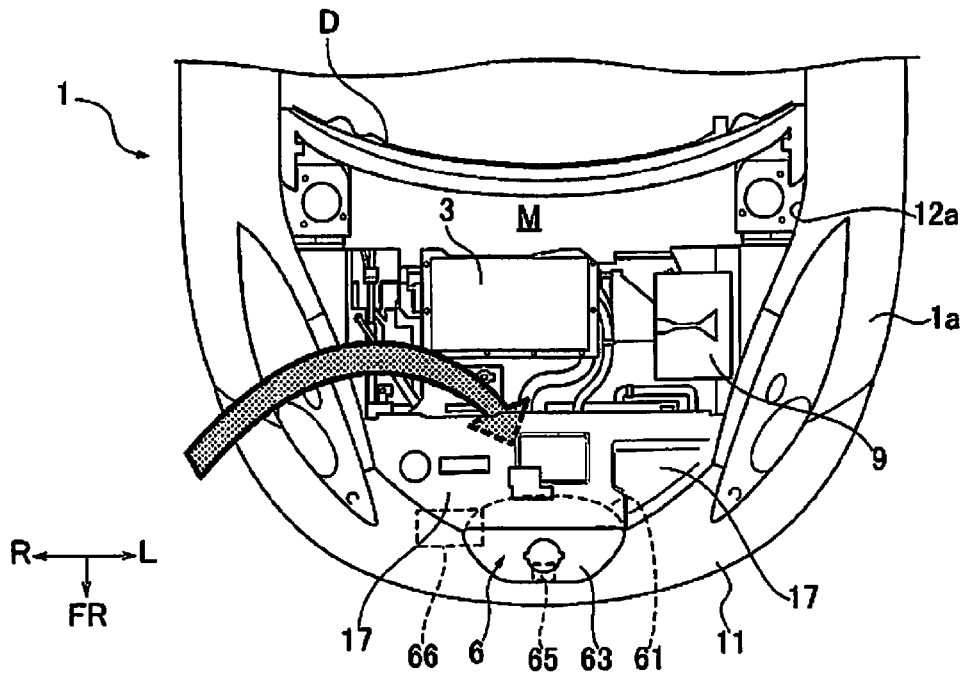
FIG. 12A is a plan view of the front part of the electric vehicle, illustrating unlocking of the port lid lock mechanism by a manual operation.
Figure 12B:
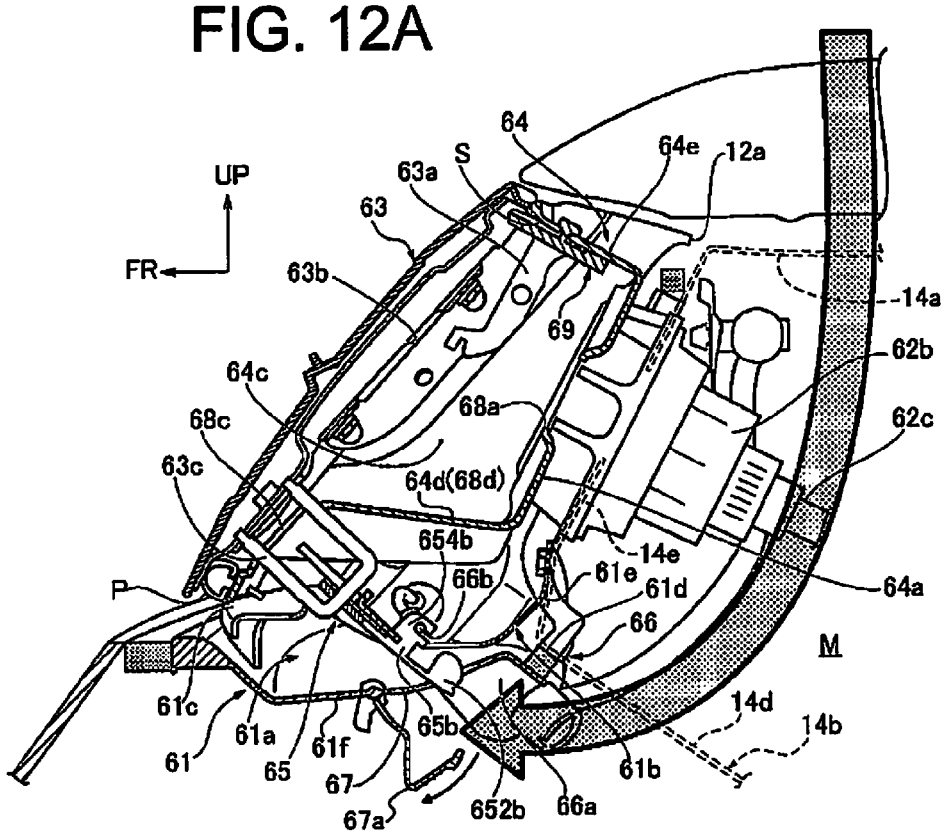
FIG. 12B is a sectional view of relevant parts of the charging port unit, illustrating unlocking of the port lid lock mechanism by a manual operation.

FIGS. 12A and 12B are views illustrating unlocking of the port lid lock mechanism by a manual operation. FIG. 12A is a plan view of the front part of the electric vehicle, and FIG. 12B is a sectional view illustrating the relevant parts of the charging port unit. The port lid manual unlocking action is described below using FIGS. 12A and 12B.

In the charging port structure of the illustrated embodiment, when a malfunction occurs in the electric actuator 66a or another component of the electric unlocking mechanism 66 and the port lid lock mechanism 65 cannot be unlocked by the electric unlocking mechanism 66, it is possible to unlock the port lid lock mechanism 65 by a manual operation.

In order to unlock the port lid lock mechanism 65 by a manual operation, an operator first unlocks a door locking mechanism or the like to open a door not illustrated in the drawings, and enters the passenger compartment space R. The operator then unlocks the hood locking mechanism 13 provided between the compartment opening 12a and the front hood 12 by performing an operation from inside the passenger compartment space R. The front hood 12 thereby pops up. The operator then exits the vehicle from the passenger compartment space R, pivots the front hood 12 in the vehicle-upward direction by a manual operation, and opens the compartment opening 12a.

As indicated by an arrow in FIG. 12A, a hand is then inserted into the motor compartment M from the compartment opening 12a, and the access opening 67 is accessed. At this time, as illustrated in FIG. 12A, since the charging port unit 6 is covered by the air guide 17, the access opening 67 is easily reached by removing the air guide 17.

When the access opening 67 is reached, the lid member 67a is pivoted in the vehicle-downward direction and the access opening 67 is opened, as illustrated in FIG. 12B. When the access opening 67 is opened, the manual operation part 652b of the lever 65b of the port lid lock mechanism 65 protruding outside the port housing 61 form the access opening 67, i.e., into the motor compartment M, is exposed. A fingertip inserted as indicated by the arrow in FIG. 12B is then placed on the manual operation part 652b, and the lever 65b is rotated against the urging force of the urging spring 65d.

The action of the port lid lock mechanism 65 at this time is the same as the action of unlocking by the electric unlocking mechanism 66. Specifically, engagement with the rotary member 65c is removed by the pivoting of the lever 65b, and the rotary member 65c pivots in the direction of opening the striker 63c by the urging force of the urging spring 65d. Engagement between the rotary member 65c and the striker 63c is thereby removed, and the port lid 63 pops up due to the restorative elastic force of the parting seal P provided to the port cover 64.

When the port lid lock mechanism 65 is to be unlocked by a manual operation in this manner, the door locking mechanism is unlocked and the passenger compartment space R is entered. The hood locking mechanism 13 is then unlocked from the passenger compartment space R and the compartment opening 12a is opened. Lastly, a hand is introduced into the motor compartment M from the compartment opening 12a, and unlocking is performed by an operation from the compartment opening 12a. Specifically, a plurality of locking mechanisms (door locking mechanism and hood locking mechanism 13) must be unlocked in order to unlock the port lid lock mechanism 65.

Here, the locking mechanisms (door locking mechanism and hood locking mechanism 13) are difficult to unlock by unauthorized access, and the front hood 12 or a door provided to the electric vehicle 1 cannot easily be opened. Since the locking mechanisms (door locking mechanism and hood locking mechanism 13) then cannot be unlocked to enter the passenger compartment space R and open the compartment opening 12a, the port lid lock mechanism 65 cannot be unlocked by manual operation from the compartment opening 12a. As a result, unlocking of the port lid lock mechanism 65 by unauthorized manual operation can be suppressed, and theft prevention can be enhanced.

Arrangement of the Manual Unlocking Structure

As illustrated in FIG. 12A, in the charging port structure of the illustrated embodiment, the access opening 67 for enabling the port lid lock mechanism 65 to be accessed from the compartment opening 12a is formed in the bottom surface 61f facing in the vehicle-downward direction in the housing main body 61a of the port housing 61. Here, the compartment opening 12a formed in the outer panel 1a of the electric vehicle 1 opens in the vehicle-upward direction. Therefore, the bottom surface 61f of the housing main body 61a faces the opposite direction from the opening direction of the compartment opening 12a, and is in a region not directly visible from the compartment opening 12a.

Therefore, by this configuration in which the access opening 67 is formed in the bottom surface 61f of the housing main body 61a in a region not directly visible from the compartment opening 12a, even when the hood locking mechanism 13 is released by unauthorized means to open the front hood 12, for example, and the compartment opening 12a is opened, the access opening 67 cannot directly be seen from above the compartment opening 12a.

Through this configuration, when the presence of the access opening 67 is unknown, the access opening 67 cannot easily be discovered even by placing a hand into the motor compartment M from the compartment opening 12a, and the port lid lock mechanism 65 cannot be unlocked by a simple manual operation. Unlocking of the port lid lock mechanism 65 by unauthorized manual operation can therefore be suppressed, and theft prevention can be enhanced.

In particular, in the illustrated embodiment, the access opening 67 is formed in the bottom surface 61f of the housing main body 61a facing in the vehicle-downward direction with respect to the compartment opening 12a, which is open in the vehicle-upward direction. Specifically, viewing from above the compartment opening 12a is necessary in order to see into the motor compartment M from the compartment opening 12a. Therefore, for a vehicle body opening that is open to a side of the vehicle, for example, it is more difficult to see into the motor compartment M relative to a case in which an access opening is formed in a portion facing the inside of the vehicle. As a result, for a person unaware of the presence of the access opening 67, the access opening 67 is less easily discovered, and theft prevention can be enhanced.

In the charging port structure of the illustrated embodiment, a lid member 67a capable of opening and closing is provided to the access opening 67. The access opening 67 is therefore blocked by the lid member 67a when the port lid lock mechanism 65 is not being unlocked by a manual operation. The housing main body 61a of the port housing 61 can thereby be prevented from becoming flooded by rain, snow, and the like from the access opening 67.

Furthermore, the manual operation part 652b formed on the lever 65b of the port lid lock mechanism 65 protrudes into the motor compartment M, which is the outside of the port housing 61, from the access opening 67. The manual operation part 652b therefore readily touches an operator's hand inserted in the motor compartment M. Specifically, when an operator who is aware of the presence of the access opening 67 unlocks the port lid lock mechanism 65 by a manual operation and not by unauthorized access, the operator can easily discover the access opening 67 which is set in a region not directly visible from the compartment opening 12a.

In the illustrated embodiment in particular, the lid member 67a provided to the access opening 67 has a projection 67b which accommodates the shape of the manual operation part 652b protruding to the outside of the port housing 61 from the access opening 67. The access opening 67 can therefore be more easily discovered despite being in a region not directly visible from the compartment opening 12a.

By a configuration in which the front hood 12 covers the compartment opening 12a of the motor compartment M so as to be able to open and close, and the port lid lock mechanism 65 can be unlocked by a manual operation from the compartment opening 12a, as in the charging port structure of the illustrated embodiment, the access opening 67 can be made less visible using an existing vehicle body structure, and theft prevention can be enhanced.

Arrangement of the Electric Unlocking Mechanism

In the charging port structure of the illustrated embodiment, the electric actuator 66a in the electric unlocking mechanism 66 penetrates through a lateral surface of the port housing 61, as illustrated in FIG. 5. Specifically, a portion of the electric actuator 66a is disposed inside the port housing 61, and the remainder thereof protrudes into the motor compartment M beside the port housing 61. The wire 66b of the electric unlocking mechanism 66 is housed in the port housing 61.

As illustrated in FIG. 12A, the port housing 61 is disposed in the vehicle-body front end 1b of the electric vehicle 1, and is disposed in a region of the motor compartment M further toward the front of the vehicle than the visible range of view obtainable when looking into the compartment opening 12a.

The electric unlocking mechanism 66 is therefore disposed in the vicinity of the port housing 61, in a region further toward the front of the vehicle than the visible range of view obtainable when looking into the compartment opening 12a. Specifically, of the electric unlocking mechanism 66, the wire 66b and a portion of the electric actuator 66a are disposed inside the port housing 61, and are therefore not disposed in the visible range of view obtainable when looking into the compartment opening 12a. A portion of the electric actuator 66a protrudes on a side of the port housing 61, but the port housing 61 is covered by the air guide 17 and disposed in a region further toward the front of the vehicle than the visible range of view obtainable when looking into the compartment opening 12a. A portion of the electric actuator 66a protruding on the side of the port housing 61 is therefore also covered by the air guide 17 and disposed in a region further toward the front of the vehicle than the visible range of view obtainable when looking into the compartment opening 12a.

Through this configuration, the electric unlocking mechanism 66 can be disposed in a region not facing an opening portion of the compartment opening 12a, and the electric unlocking mechanism 66 can be made less noticeable. The electric unlocking mechanism 66 can thus be made difficult to discover when a person who is unaware of the presence of the electric unlocking mechanism 66 looks into the motor compartment M from the compartment opening 12a. As a result, it is possible to prevent the electric unlocking mechanism 66 from being operated mischievously or by other unauthorized means, and to prevent the port lid lock mechanism 65 from being unlocked. By a configuration in which the electric unlocking mechanism 66 is disposed in a region further toward the front of the vehicle than the visible range of view obtainable when looking into the compartment opening 12a, the electric unlocking mechanism 66 can be covered by the outer panel 1a on the periphery of the compartment opening 12a. The electric unlocking mechanism 66 can thereby be made less prone to water exposure even when rainwater or the like falls into the motor compartment M from the compartment opening 12a, for example. Specifically, the air guide 17 or the outer panel 1a on the periphery of the electric unlocking mechanism 66 acts as a roof, and flooding of the electric unlocking mechanism 66 with rainwater or the like can be prevented. As a result, the weather resistance of the electric unlocking mechanism 66 can be enhanced.

In particular, in the illustrated embodiment, the compartment opening 12a is covered by the front hood 12, and the electric unlocking mechanism 66 protruding into the motor compartment M is covered by the front hood 12. Here, the front hood 12 is kept closed by the hood locking mechanism 13 unlocked by an operation from the passenger compartment space R. Therefore, in order to access the electric unlocking mechanism 66 via the compartment opening 12a, it is necessary to release the door locking mechanism and enter the passenger compartment space R, unlock the hood locking mechanism 13, and open the front hood 12. It is thereby possible to prevent the electric unlocking mechanism 66 from being operated mischievously or by other unauthorized means, and to even further enhance theft prevention.

Furthermore, in the charging port structure of the illustrated embodiment, the port housing 61 is disposed in the vehicle-body front end 1b of the electric vehicle. The compartment opening 12a is also opened in the vehicle-upward direction, and the electric actuator 66a of the electric unlocking mechanism 66 is disposed beside the port housing 61. Therefore, compared with a case in which the electric unlocking mechanism 66 is disposed on the vehicle-rear side or the vehicle-front side of the port housing 61, for example, the length of the vehicle can be kept from increasing in the front-rear direction. The electric unlocking mechanism 66 can also be made less easily discovered, and theft prevention can be enhanced.

Effects will next be described. In the charging port structure of the illustrated embodiment, the effects cited below can be obtained.

(1) The charging port structure includes: a charging port 62 provided inside a port housing 61 provided to an electric vehicle (electric vehicle) 1; a port lid 63 for covering a forward opening part (front opening part) 61*c* of the port housing 61 so as to be able to open and close; a port lid lock mechanism 65 for maintaining the port lid 63 closed; a compartment opening (vehicle body opening) 12*a* provided to an outer panel (vehicle body surface) 1*a* in the vicinity of the charging port 62; a front hood (body opening lid) 12 for covering the compartment opening 12*a* (vehicle body opening) 12*a* so as to be able to open and close; a hood locking mechanism (body opening lid lock mechanism) 13 for maintaining the front hood (body opening lid) 12 closed, the hood locking mechanism 13 being unlocked by an operation from inside a passenger compartment space (passenger compartment) R; an electric unlocking mechanism 66 for unlocking the port lid lock mechanism 65 by an electric actuator 66*a*; and an access opening (manual unlocking structure) 67 for enabling the port lid lock mechanism 65 to be unlocked by a manual operation from the compartment opening 12*a* (vehicle body opening) 12*a*. Through this configuration, the access opening 67, which is a manual unlocking structure, is made difficult to access, unlocking of the port lid lock mechanism by unauthorized manual operation is suppressed, and theft prevention can be enhanced.

(2) The port lid lock mechanism 65 is provided inside the port housing 61; and the manual unlocking structure is provided to the port housing 61 and configured as an access opening 67 for enabling access to the port lid lock mechanism 65, and the access opening 67 is set in a region not directly visible from the compartment opening (vehicle body opening) 12*a*. Through this configuration, the access opening 67 is set in a region not directly visible from the compartment opening 12*a*, which is a vehicle body opening, and the access opening 67 thereby cannot easily be discovered by a person who is unaware of the position of the access opening 67, and theft prevention can be enhanced.

(3) A lid member 67*a* capable of opening and closing is provided to the access opening 67. Through this configuration, it is possible to prevent the inside of the port housing 61 from being flooded by rainwater, snow, or the like from the access opening 67.

(4) A manual operation part (at least a portion) 652*b* of the port lid lock mechanism 65 is caused to protrude to the outside of the port housing 61 from the access opening 67. Through this configuration, an operator who is aware of the presence of the access opening 67 can easily discover the access opening 67 when unlocking the port lid lock mechanism 65 by a manual operation.

(5) The vehicle body opening is configured as a compartment opening 12*a* of a motor compartment (drive source compartment) M in which a drive motor (travel drive source) 2 is disposed; and the body opening lid is configured as a front hood (hood) 12 for opening and closing the compartment opening 12*a*. Through this configuration, the access opening 67 for enabling the port lid lock mechanism 65 to be unlocked by a manual operation can be made less visible using an existing vehicle body structure, and theft prevention can be enhanced (6) The port housing 61 is disposed in a vehicle-body front end (front end) 1*b* of the electric vehicle (electric vehicle) 1; and the electric unlocking mechanism 66 is disposed in a region further toward the front of the vehicle than the visible range of view obtainable when looking into the compartment opening 12*a*. Through this configuration, the electric unlocking mechanism 66 can be made less noticeable, the port lid lock mechanism 65 can be prevented from being unlocked by unauthorized means, the electric unlocking mechanism 66 can be made less prone to water exposure, and the weather resistance of the electric unlocking mechanism 66 can be enhanced.

The charging port structure of the present invention is described above on the basis of the illustrated embodiment, but the specific configuration thereof is not limited by the example, and various design changes or additions may be made thereto insofar as such changes or additions do not deviate from the gist of the invention as recited in the claims.

In the illustrated embodiment, the vehicle body opening is configured as a compartment opening 12*a* of a motor compartment M which is open in the vehicle-upward direction, but the present invention is not limited by this example. The vehicle body opening may also be a dedicated opening part provided in a vehicle body surface or an opening part in a trunk compartment for manual unlocking of the port lid lock mechanism 65. The motor compartment M is also provided in the front part of the vehicle body in the illustrated embodiment, but the motor compartment M may be provided in a rear part of the vehicle body when the charging port unit 6 is disposed in the rear part of the vehicle body. In the illustrated embodiment, the charging port structure of the present invention is applied to an electric vehicle 1 in which the travel drive source uses only electricity, but the charging port structure of the present invention may also be applied to a hybrid vehicle having an engine and a drive motor as travel drive sources if the vehicle is capable of charging from an external power source.

In the illustrated embodiment, the manual unlocking structure is configured as an access opening 67 formed in the port housing 61, and is configured so as to be capable of directly contacting the lever 65*b* of the port lid lock mechanism 65, but the present invention is not limited by this example. For example, a configuration may be adopted in which a second wire separate from the wire 66*b* connected to the electric actuator 66*a* is connected to the lever 65*b* of the port lid lock mechanism 65, and the second wire can be pulled by a manual operation.

The invention claimed is:

1. A charging port structure comprising:
  a charging port provided inside a port housing in an electric vehicle;
  a port lid capable of opening and closing a front opening of the port housing;
  a port lid lock mechanism maintains the port lid in a closed state;
  a vehicle body opening provided in a vehicle body surface in a vicinity of the front opening of the port housing having the charging port;
  a body opening lid capable of opening and closing the vehicle body opening;
  a body opening lid lock mechanism maintains the body opening lid in a closed state, the body opening lid lock mechanism being unlocked by an operation from inside a passenger compartment;

an electric unlocking mechanism unlocking the port lid lock mechanism by an electric actuator; and a manual unlocking structure provided inside of the vehicle body opening and enabling the port lid lock mechanism to be unlocked by a manual operation from the vehicle body opening.

2. The charging port structure according to claim 1, wherein the port lid lock mechanism is provided inside the port housing; and the manual unlocking structure is provided to the port housing and configured as an access opening for enabling access to the port lid lock mechanism, and the access opening is set in a region not directly visible from the vehicle body opening.

3. The charging port structure according to claim 2, further comprising a lid member capable of opening and closing the access opening.

4. The charging port structure according to claim 2, wherein at least a portion of the port lid lock mechanism protrudes to the outside of the port housing from the access opening.

5. The charging port structure according to claim 1, wherein the vehicle body opening is configured as a compartment opening of a drive source compartment in which a drive source is disposed; and the body opening lid is configured as a hood for opening and closing the compartment opening.

6. The charging port structure according to claim 5, wherein the port housing is disposed in a front end of the electric vehicle; and the electric unlocking mechanism is disposed in a region further toward the front of the vehicle than a visible range of view obtainable when looking into the compartment opening.

7. The charging port structure according to claim 3, wherein at least a portion of the port lid lock mechanism protrudes to the outside of the port housing from the access opening.

8. The charging port structure according to claim 2, wherein the vehicle body opening is configured as a compartment opening of a drive source compartment in which a drive source is disposed; and the body opening lid is configured as a hood for opening and closing the compartment opening.

9. The charging port structure according to claim 8, wherein the port housing is disposed in a front end of the electric vehicle; and the electric unlocking mechanism is disposed in a region further toward the front of the vehicle than a visible range of view obtainable when looking into the compartment opening.

10. The charging port structure according to claim 3, wherein the vehicle body opening is configured as a compartment opening of a drive source compartment in which a drive source is disposed; and the body opening lid is configured as a hood for opening and closing the compartment opening.

11. The charging port structure according to claim 10, wherein the port housing is disposed in a front end of the electric vehicle; and the electric unlocking mechanism is disposed in a region further toward the front of the vehicle than a visible range of view obtainable when looking into the compartment opening.

12. The charging port structure according to claim 4, wherein the vehicle body opening is configured as a compartment opening of a drive source compartment in which a drive source is disposed; and the body opening lid is configured as a hood for opening and closing the compartment opening.

13. The charging port structure according to claim 12, wherein the port housing is disposed in a front end of the electric vehicle; and the electric unlocking mechanism is disposed in a region further toward the front of the vehicle than a visible range of view obtainable when looking into the compartment opening.

14. A charging port structure comprising:

a charging port provided inside a port housing in an electric vehicle;

a port lid capable of opening and closing a front opening of the port housing;

a port lid lock mechanism maintains the port lid in a closed state, the port lid lock mechanism including an engaging part that engages a part of the port lid to maintain the port lid in the closed state, the port lid lock mechanism further including a manual operation part that disengages the engaging part to release the port lid;

a vehicle body opening provided in a vehicle body surface in a vicinity of the charging port;

a body opening lid capable of opening and closing the vehicle body opening;

a body opening lid lock mechanism maintains the body opening lid in a closed state, the body opening lid lock mechanism being unlocked by an operation from inside a passenger compartment;

an electric unlocking mechanism unlocking the port lid lock mechanism by an electric actuator; and a manual unlocking structure enabling the port lid lock mechanism to be unlocked by a manual operation from the vehicle body opening, the manual unlocking structure enabling access to the manual operation part to unlock the port lid locking mechanism by manual operation of the manual operation part from the vehicle body opening.

* * * * *